Feb. 6, 1973    N. L. SONNABEND    3,714,722
CHILDREN'S GAME APPARATUS
Original Filed Feb. 23, 1968    5 Sheets-Sheet 1

INVENTOR
NANCY L. SONNABEND

*Kenway Jenney & Hildreth*

ATTORNEYS

Feb. 6, 1973  N. L. SONNABEND  3,714,722
CHILDREN'S GAME APPARATUS
Original Filed Feb. 23, 1968  5 Sheets-Sheet 2

INVENTOR.
NANCY L. SONNABEND

ATTORNEYS

Feb. 6, 1973  N. L. SONNABEND  3,714,722
CHILDREN'S GAME APPARATUS
Original Filed Feb. 23, 1968  5 Sheets-Sheet 3

INVENTOR.
NANCY L. SONNABEND

ATTORNEYS

Feb. 6, 1973  N. L. SONNABEND  3,714,722
CHILDREN'S GAME APPARATUS
Original Filed Feb. 23, 1968  5 Sheets-Sheet 4
FIG. 7(a)
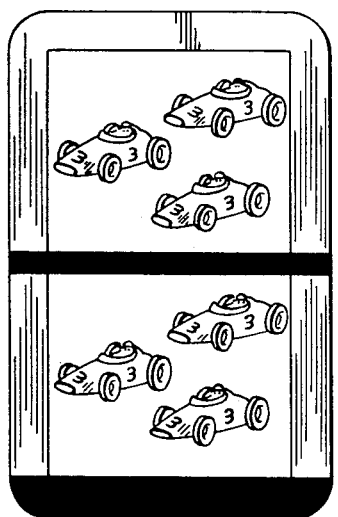
54
FIG. 10(a)
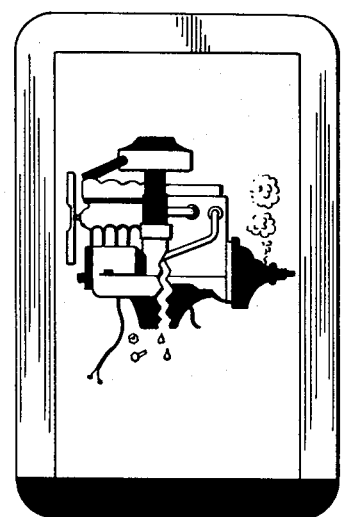
54
FIG. 10(b)
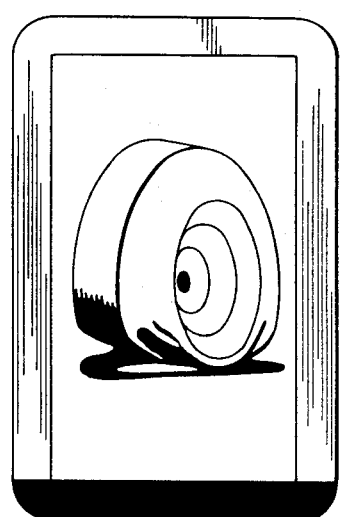
54
54
FIG. 7(b)
54
FIG. 10(c)
54
FIG. 10(d)
INVENTOR.
NANCY L. SONNABEND
Kenway Jenney & Hildreth
ATTORNEYS Feb. 6, 1973   N. L. SONNABEND   3,714,722
CHILDREN'S GAME APPARATUS
Original Filed Feb. 23, 1968   5 Sheets-Sheet 4
FIG. 8
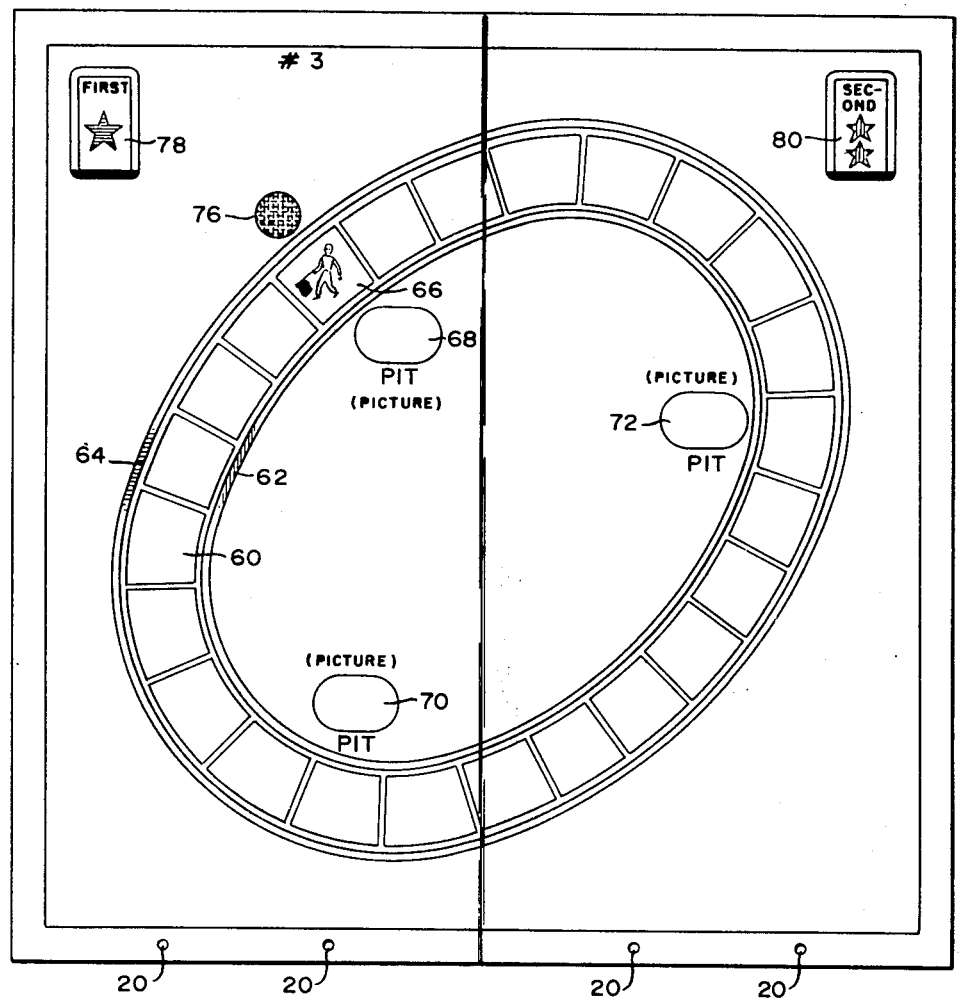
FIG. 9
INVENTOR
NANCY L. SONNABEND
ATTORNEYS United States Patent Office 3,714,722
Patented Feb. 6, 1973

3,714,722
CHILDREN'S GAME APPARATUS
Nancy L. Sonnabend, 24 Greenhill Road,
Brookline, Mass. 02146
Original application Feb. 23, 1968, Ser. No. 707,681.
Divided and this application Mar. 1, 1971, Ser.
No. 119,674
The portion of the term of the patent subsequent to
Mar. 2, 1988, has been disclaimed
Int. Cl. G09b 1/00
U.S. Cl. 35—8                                    8 Claims

ABSTRACT OF THE DISCLOSURE

This invention relates to apparatus for playing an instructional series of games. The apparatus is constructed and arranged to enable a very young child to learn, by playing the games in sequence, the necessary abstract concepts required to play conventional board games. The preferred embodiment of the invention includes a game board having printed thereon three different playing surfaces, two sets of counters, each of a different color and a container therefor, cards to provide random counts for the players and to determine the order of play, a card holder, counters for counting the number of times a path has been traversed and a holder therefor. By learning to play each of the three games in sequence a young chlid will readily learn to play conventional board games.

SUMMARY OF THE INVENTION

This application is a divisional of my copending patent application Ser. No. 707,681, filed Feb. 23, 1968, now Pat. No. 3,566,484, entitled "Children's Game Apparatus."

My invention relates to apparatus for playing a series of board games and more particularly to a series of board games designed to teach a very young child, who has the ability, for example, to count only as high as three, to play a conventional board game such as is played by older children and adults.

Conventional board games usually provide a printed game board, divided into spaces, on which players move playing pieces in turn in accordance with a random number selector. The random number selector may be dice, a spinning pointer mounted above a surface on which numbers are printed or the like. As the players move their pieces around the game path, they encounter hazards or advantages depending upon the space on which they land. Many of the more successful and sophisticated board games require that the players traverse the path printed on the game board several times before the game is completed.

While it is not generally realized by older children and adults, board games of the type described involve several abstract concepts which are unfamiliar to very young children; these abstract concepts make it difficult for young children to learn to play conventional board games when the concepts are presented to the child all at one time. For example, in a conventional game, the abstract concepts include the fact that all the players may use the same printed path on the board. Further, the concept of obtaining a number, chosen randomly from a set in turn, and then counting spaces from the players present counter location to a new location, is a difficult abstract concept for a young child. The concept of "winning" a game is also difficult for young children to grasp. Most presently available board games are either designed to be very simple in their play, so that any one of these abstract concepts is made clear, or are so complex that only a child who has at least learned to read and is familiar with abstract concepts can play them. Even a young child quickly becomes bored by the very simple games and yet cannot grasp at one time the complex set of abstract notions required to play a conventional board game.

The games of my invention are preferably played on a single folding game board on which are printed three different playing surfaces. The games progress from one requiring only a minimum of abstract concepts to a game which is a simple, but relatively conventional board game. By utilizing these three playing surfaces and the associated counters, cards, etc. as will be described more fully below, to play games associated with each of the three playing surfaces in turn, the child will learn quickly and in an enjoyable manner, the concepts required to play conventional board games.

Accordingly, it is a principal object of my invention to provide apparatus for playing a series of instructional board games for use in sequence by children to learn to play conventional board games. A further object of my invention is to provide apparatus for playing a series of board games of the type described, the playing surfaces for which may be readily combined on a single folding board. A further object of my invention is to provide a series of games of the type described, the accessory parts of which are simple and readily adapted for use by children. A still further object of my invention is to provide colorful and attractive apparatus to play a series of games of the class described which may be attractively yet inexpensively manufactured.

These and other objects and features of the game apparatus of my invention will become apparent from the following description taken in connection with the accompanying drawings in which.

Figure 4A:
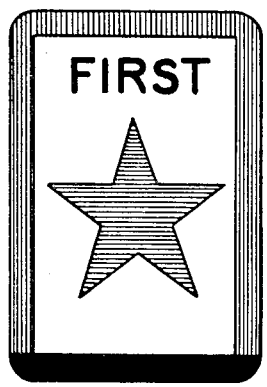
Figure 4B:
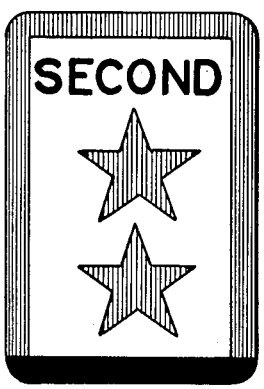
Figure 5:
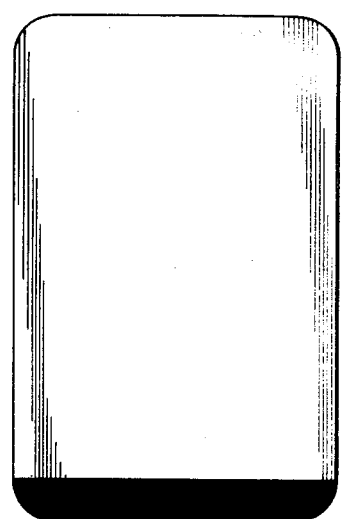
Figure 6A:
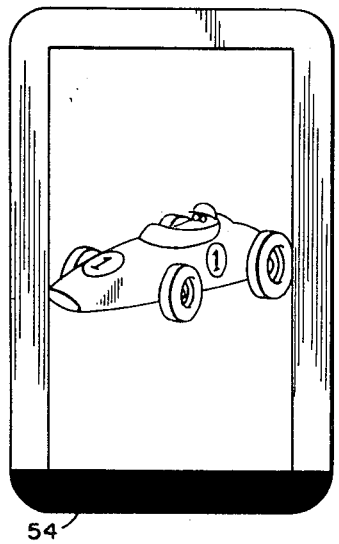
Figure 6B:
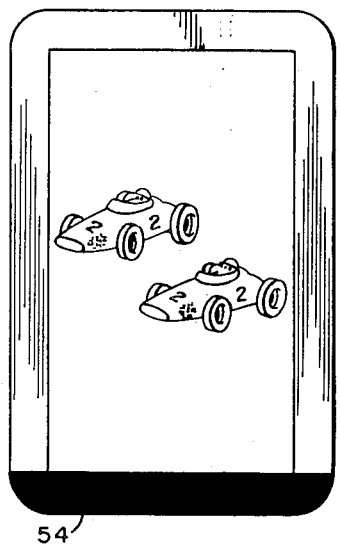

FIGS. 4(a) and 4(b) illustrate the cards used to determine the order of play;

FIG. 5 illustrates the reverse of the cards utilized in the game to determine the play;

FIGS 6(a), 6(b) and 6(d) illustrate the cards used to specify moves of one, two or three spaces respectively;

FIGS. 7(a) and 7(b) illustrate cards used to provide double turns and loss of a turn;

FIG. 8 is a drawing of the board for the third of the series of games;

FIG. 9 is a drawing of the trophy and flags used in the third game; and

FIGS. 10(a), 10(b), 10(c) and 10(d) illustrate cards useful in playing the third of the three games.

DETAILED DESCRIPTION

As has been noted above one object of the game apparatus of my invention is to provide a series of instructional games for use by children. Typically children's games have a "theme" which is carried out by illustrations on the box cover, the playing pieces and in the literature, such as the rule book, which is supplied with the game. In the games described herein the theme will be automobile racing. Thus the playing pieces are small automobile racing cars, the pictures in FIGS. 10(a) through 10(d) are associated with automobile racing and this "theme" is generally carried out in the packaging and game instructions. However, it is to be understood that the apparatus of my invention is not to be limited to this theme; other themes including sail or motor-boat racing etc.

could be used. A racing theme is most applicable to the game concept however, as will be described below.

Figure 1:
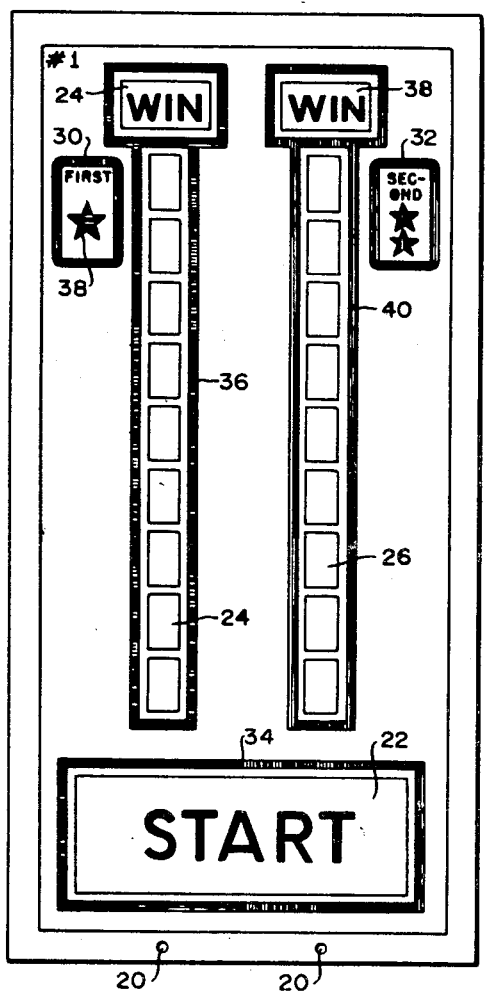
FIG. 1 is a drawing of the board for the first of the series of games.
Figure 2:
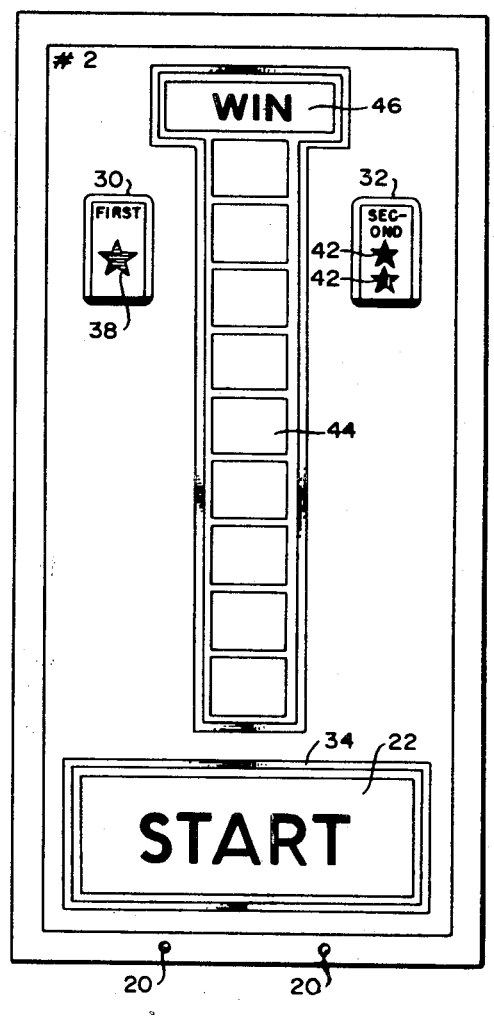
FIG. 2 is a drawing of the board for the second of the series of games.

Preferably, although not necessarily, a single game board is provided which is roughly rectangular in shape. This game board is capable of being folded in half so that one-half overlies the other. On one side the playing surfaces of FIGS. 1 and 2 are provided. On the other side the playing surface of FIG. 8 is provided. Eyeleted openings 20 are provided at the bottom of the game boards for purposes to be described below.

As shown in FIG. 1, the first game board includes a space 22 labelled "START" on which the counters are placed at the beginning of the game, two segmented paths, 24 and 26 here shown as being divided into 9 spaces and a space 28 and 33 labelled "WIN" is associated with each of the paths. Spaces 30 and 32 are provided for the cards which determine order of play. The word "SECOND" in space 32 is not divided on the actual board, but is illustrated as being divided to provide large letters for the readers use. In the drawings color is indicated by lining, horizontal lining representing for example blue and vertical lining red. It will be observed in FIG. 1 that the left hand portion of the border 34 around the "START" space is blue, the left hand path 24 is surrounded by a blue border 36, as is the left hand "WIN" space 28. Similarly the single "STAR" 38 in the space 30 is colored blue. The right hand portion of the border 34, the border 40 surrounding the right hand path and the right hand "WIN" space are colored red as are the two stars 42 in the space 32. The purpose of this coloring is to enable the young players to readily determine those portions of the board on which they are to play and those on which their opponent is to play.

The game board of FIG. 2 is similar to that of FIG. 1 except that a single segmented path 44 and a single "WIN" space 46 is provided. The colored border 48 surrounding the path 44 and the "WIN" space 46 is colored blue on the left hand side of the vertical axis of symmetry of the board and red on the right hand side of this vertical axis. It will be apparent that the same games can be played on the board of FIG. 2 as on the board of FIG. 1, but that on the board of FIG. 2, both players will use the same path, whereas on the board of FIG. 1 both players use separate paths. The colored borders described above aid the young child in making the transition from the board of FIG. 1 to that of FIG. 2.

Figure 3:
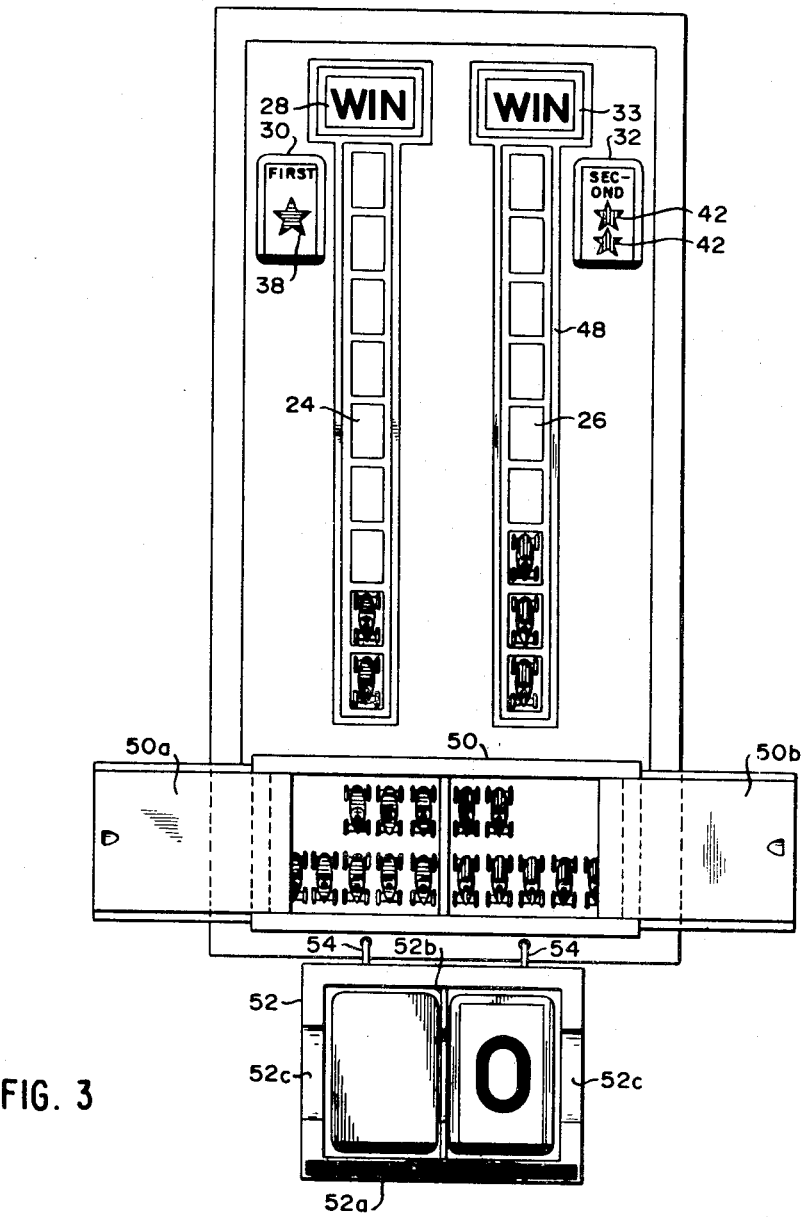
FIG. 3 is a drawing of the first game board when in use to play the simplest of the three games.

In FIG. 3, I have illustrated the board of FIG. 1 in use in playing the simplest of three games that may be played thereon. As shown a box 50 may be provided to hold the playing pieces. As illustrated 20 total playing pieces are provided, 10 of each color. These are contained in the box 40 which has sliding covers 50a and 50b. The covers may also be colored blue and red as shown. The container is placed over the "START" space 22 with all pieces therein at the beginning of the game.

Additionally, at the beginning of the game a card tray 52 having hooks 54 on one side is positioned at the bottom of the board with the hooks 54 engaging the eyeletted holes 20. The card tray 52 is a box having four sides and an open top. Its interior dimensions are such that it will conveniently receive two packs of cards in the arrangement illustrated. A divider 52b is provided to separate the two stacks of cards; the sides of the tray and the divider are provided with cutouts 52c to facilitate removal of the cards from the tray.

Figure 6C:
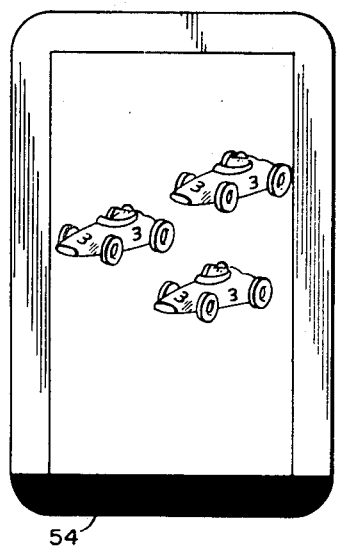

For the simplest of the three games the cards that are placed in the card holder may include eight cards similar to FIG. (6a), six cards similar to FIG. 6(b) and three cards similar to FIG. 6(c). In addition three cards similar to FIG. 7(b) may be included for a total of twenty cards. It will be observed that all the cards are provided with a black bottom border on both sides as at 54 in FIGS. 5, 6, 7 and 10. This contrasting border assists young chlidren in arranging the cards in a deck so that none are inverted top to bottom. The card tray 52 has a black bottom edge at 52a which matches that on the cards. Additionally the cards are preferably of a solid color on the observe side so that all may be readily arranged facing in the same direction. These cards are shuffled and placed face down on the left hand side of the card tray 52 with the black edge matching that of the card tray before commencement of play.

To provide an incentive for winning the game two similar rewards are placed in each of the "WIN" spaces 28 and 30. These may take the form of a single pretzel, a piece of wrapped candy or the like. These have not been illustrated since the reward will depend upon the circumstances under which the game is played.

The game on the game boards illustrated in FIGS. 1, 2 and 3 is designed for two children. To determine which of them plays first, the cards of FIGS. 4(a) and 4(b) are provided. As is apparent, these are desirably of a different size than the counter cards. They are shuffled and dealt face down to the two players. The player receiving the card of FIG. 4(a) having a single blue star goes first and places his card over the identical space 30 at the upper left of the game board. He will use the game pieces which are also colored blue. The other player places his card having two red stars over the space 32 at the upper right corner of the board and uses the red playing pieces. It is desirable that the two players sit at the bottom of the board with the player whose turn is first seated on the left.

Play begins with the player on the left drawing a card from the left hand pile in the card tray. He then places it face up on the right hand side of the tray, says aloud the number of racing cars appearing on it, and draws the same number of playing pieces of his color from the container 50 and places them on the segments of his path. Thus, in FIG. 3 the left hand player may have drawn a "two" and the right hand player a "three" on their respective first turns. The playing pieces are placed on the segmented path beginning at the bottom and never skipping a space. Should a player draw a "0" card (FIG. 7b) he forfeits his turn.

The player wins the game who first fills all the segments on his "road" and places the last car in the "WIN" space by exact count. Thus, should a player have all spaces except the "WIN" space filled and draw a "0," "2" or "3" from the pile he forfeits his turn. The child who wins gets both of the rewards placed in the win space.

It will be observed that this game is quite simple and requires a minimum of abstract concepts. Two defined paths are provided, one for each player and these are clearly identified by color. The order of play is simple. The filling up of the segments of the road graphically illustrates how a board game progresses, even to a very young child.

Once a child has learned to play the game described above, the same game apparatus may be used to play two more advanced variations. In the first of these, two cars are used by each player and both are placed on the "START" space 22. Each player first moves one car on his first turn counting from the "START" space. On his second turn, the player, after stating the number of cars on the card he has turned up, places his finger beside his car on is path and using the other hand picks up the care he has in the "START" space. He then counts forward from his car already on the segmented path in accordance with the number on the card he turned up. After placing his second car, the first car is returned to the "START" space to be used on the next turn. The game proceeds otherwise as described above.

In another more advanced variation on the basic game each player has only one playing piece as in conventional board games. In this version the child's finger alone marks the location from which counting begins, and as the child learns this concept, even the finger designating the space from which counting begins may be eliminated.

It will be apparent that after the child has progressed through these three variations on the board of FIG. 1, he will have mastered some of the basic concepts of board game play. However, in the board of FIG. 1 each child has traveled his own "road." The next step is to introduce the child to the concept that both players may use a single segmented path or "road" and for this purpose the board of FIG. 2 is used. As has been mentioned the border around the single "road" in FIG. 2 is divided about the axis of symmetry into a "blue" side on the left and a "red" side on the right. The same games may be played on the board of FIG. 2 as on FIG. 1, first using a number of playing pieces equal to the number of segments, then two playing pieces and finally a single playing piece. Preferably the same cards are used in playing the games on both the board of FIGS. 1 and 2. When the players are playing with single playing pieces on the board of FIG. 2, they will have mastered the fundamental concepts necessary for the play of a simple more or less conventional board game. Apparatus for such a game is provided by the playing surface of FIG. 8.

As shown, the board of FIG. 8 is placed on a game board about twice the size of FIGS. 1 and 2 and consists of a closed segmented path 60 or "road" in contrast with the open path of FIGS. 1 and 2. In keeping with the "theme" of the game here illustrated, the closed figure is an oval shape, although of course other shapes might be used. The oval in FIG. 8 is bordered by an inner and an outer boarder 62 and 64 respectively. These borders are colored as were the borders of the "road" in FIG. 2, the outer border being blue for example and the inner border red. One of the segments has an appropriate designation for starting. In the board illustrated in FIG. 8 this is the "flagman space" 66. Appropriate pictures indicating a "pit," such as 68, 70 and 72 are located within the oval and these, together with certain cards, provide the hazards common in board games. A small trophy, preferably made of metal, wood or plastic material such as is illustrated at 74, in FIG. 9 is placed beside the flagman space on the circle identified as 76. The rewards for winning, such as pretzels, candy, etc. are placed in the trophy as well as two or four checkered flags (two of which are illustrated in FIG. 9 at 78) for games played on the game board of FIG. 8 when more than a single "lap" is involved. Spaces 78 and 80 are provided for the cards which determine order of play as in the games of FIGS. 1 and 2.

The card deck used in connection with the games of FIGS. 1 and 2 is augmented by the addition of an additional card like that of FIG. 6(c), two cards each having two sets of three automobiles thereon as illustrated in FIG. 7(a) and one of each of the cards illustrated in FIGS. 10(a) through 10(d) for a total of 27 cards. These cards are shuffled and placed face down in the left hand side of the card tray illustrated in FIG. 3 and are used as previously described. The card tray is, of course, attached to one of the sets of eyeletted holes 20 at the lower edge of the board of FIG. 8.

The simplest game associated with the board of FIG. 8 consists in a single lap. For single lap games, no flags are placed in the trophy 74 but only the pretzels or candy. A single playing piece is used by each player as in the most advanced game played on the board of FIG. 2. The blue border on the outside of the oval indicates that the child with the blue playing piece stays on the outside of the oval, while the child with the red playing piece stays on the inside of the oval. The object of the game is to land on the "flagman" space 66 by exact count as previously described. As so far described, the game of FIG. 3 has merely lengthened the "road" of the game of FIG. 2 and closed it back upon itself. However, as noted above the deck of cards now contains four "picture" cards each indicating a mechanical defect such as might occur in racing automobiles and requiring a pit stop.

The rules with respect to the "pit stop" hazard may be summarized as follows.

(1) If a player draws a card such as illustrated in FIGS. 10(a) through 10(d) (hereinafter referred to as "hazard cards") he must move his playing piece back to the "pit" nearest the space which his car is occupying.
(2) If a player draws a hazard card on his first turn he moves his car to the pit next to the flagman space and counts the flagman space as one on his next turn.
(3) If a player draws a hazard card while in the pit, he forfeits his turn.
(4) If a palyer's car is to be placed in a pit already occupied by an opponent, the opponent's car is placed on the playing space next to the pit and the player's car is placed in the pit.

Thus, while both cars may occupy any playing space on the board, only one playing piece may occupy the pit at any time.

The single lap game may of course be played on the board of FIG. 3 without the hazard cards, these being introduced after the players are familiar with the single lap game itself.

The game on the board of FIG. 3 may be extended to two or three laps by placing two or four checkered flags in the trophy 74. Then each time a player lands on or passes the flagman space 66 on his first and second laps, he removes a flag from the trophy and places it on his "turn" card at the upper left or upper right corner of the board. Thus the flags serve as lap counters. The winner is the first player to land exactly on the flagman space 66 after two or three laps.

Thus, it will be apparent that I have provided game apparatus useful in instructing a child in sequential fashion to play conventional board games. The three playing surfaces and the associated apparatus enable even a very young child who can recognize colors and pictures to learn to play a board game of the conventional type by progressing easily and naturally through the games that may be played utilizing the game apparatus of my invention. In addition to normal very young children, the apparatus described has application to instructional use in connection with the teaching of children who have suffered brain damage.

While I have described the apparatus of my invention in connection with a prescribed series of games, it will be apparent that it may be utilized to play variations of the games described, or to play other games. Further, as mentioned above, while I have illustrated the game apparatus of my invention in connection with an automobile racing theme, other themes may be used without departing from the scope of my invention.

Further, while I have described cards as the preferred apparatus for selecting the order of play and for assigning numbers in random fashion in turn to each of the players, it will be apparent that other apparatus such as a rotatable spinner or appropriately marked dice might be used for this purpose.

Finally, I have described the game as being useful for two persons, but by providing extra paths on the first game board, the games would be useful for more than two persons provided that appropriate sets of playing pieces were provided.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the

PO-1050
(5/69)

UNITED STATES PATENT OFFICE
CERTIFICATE OF CORRECTION

Patent No. __3,714,722__  Dated __February 6, 1973__

Inventor(s) __Nancy L. Sonnabend__

It is certified that error appears in the above-identified patent and that said Letters Patent are hereby corrected as shown below:

Column 4, line 61, before "path", "is" should be --his--.

Column 4, line 62, "care" should be --car--.

Column 6, line 7, "back" should be --<u>back</u>-- (with underlining), alternatively printed in italics.

Column 7, line 1 of claim 5, insert --1-- after "defined in claim".

Column 8, line 25, after "turn" insert --in--.

Signed and sealed this 10th day of July 1973

(SEAL)
Attest:

EDWARD M. FLETCHER, JR.
Attesting Officer

Rene Tegtmeyer
Acting Commissioner of Patents